United States Patent
Ekedal et al.

(10) Patent No.: US 9,161,079 B1
(45) Date of Patent: Oct. 13, 2015

(54) TELEVISION ADVERTISEMENT SYSTEM AND METHOD

(71) Applicant: Ryan Justin Ekedal, Newport Beach, CA (US)

(72) Inventors: Ryan Justin Ekedal, Newport Beach, CA (US); Cheri Ekedal, Corona del Mar, CA (US)

(73) Assignee: Ryan Justin Ekedal, Newport Beach, CA (US)

( * ) Notice: Subject to any disclaimer, the term of this patent is extended or adjusted under 35 U.S.C. 154(b) by 0 days.

(21) Appl. No.: 13/777,317

(22) Filed: Feb. 26, 2013

(51) Int. Cl.
| | |
|---|---|
| H04N 7/10 | (2006.01) |
| H04N 7/025 | (2006.01) |
| H04N 21/43 | (2011.01) |
| H04N 21/433 | (2011.01) |
| H04N 21/235 | (2011.01) |
| H04N 21/258 | (2011.01) |
| H04N 21/435 | (2011.01) |
| H04N 21/442 | (2011.01) |
| H04N 21/45 | (2011.01) |
| H04N 7/173 | (2011.01) |
| H04N 21/81 | (2011.01) |
| G06Q 30/02 | (2012.01) |

(52) U.S. Cl.
CPC ............... *H04N 21/43* (2013.01); *G06Q 30/02* (2013.01); *H04N 7/17318* (2013.01); *H04N 21/235* (2013.01); *H04N 21/25891* (2013.01); *H04N 21/435* (2013.01); *H04N 21/4331* (2013.01); *H04N 21/44222* (2013.01); *H04N 21/4532* (2013.01); *H04N 21/812* (2013.01)

(58) Field of Classification Search
None
See application file for complete search history.

(56) References Cited

U.S. PATENT DOCUMENTS

| | | | | |
|---|---|---|---|---|
| 5,592,477 | A * | 1/1997 | Farris et al. | 370/396 |
| 8,046,808 | B2 * | 10/2011 | Ashley et al. | 725/86 |
| 8,249,912 | B2 * | 8/2012 | Elliott et al. | 705/7.29 |
| 8,291,465 | B2 | 10/2012 | Sussman | |
| 8,326,673 | B1 * | 12/2012 | Biere et al. | 705/7.29 |
| 2002/0083447 | A1 * | 6/2002 | Heron et al. | 725/38 |
| 2003/0110496 | A1 * | 6/2003 | Chang et al. | 725/42 |
| 2003/0167469 | A1 * | 9/2003 | Hardingham et al. | 725/61 |
| 2007/0083883 | A1 * | 4/2007 | Deng | 725/19 |

(Continued)

FOREIGN PATENT DOCUMENTS

| | | |
|---|---|---|
| CN | 102376062 A | 3/2012 |
| KR | 1020060072639 A | 6/2006 |
| KR | 1020060051444 B1 | 3/2008 |

*Primary Examiner* — Jonathan V Lewis
(74) *Attorney, Agent, or Firm* — Knobbe, Martens, Olson & Bear, LLP

(57) ABSTRACT

An information processing method combining television viewing and shopping generally includes (i) storing commercial information in a business server, (ii) broadcasting a television program according to a television program schedule from a broadcast server to a television server thereby enabling viewing of the television program by a consumer, (iii) storing the television program schedule in one of the television server and the personal server, (iv) transmitting an information request from one of the television server and the personal server to the business server, the information request including an identification of the television program and a timestamp, (v) transmitting a portion of the commercial information to one of the personal server and the television server, wherein the commercial information portion is related to the television program and the timestamp, and (vi) displaying items of the commercial information portion and a means for purchase of said items to the consumer.

15 Claims, 4 Drawing Sheets

(56) References Cited

U.S. PATENT DOCUMENTS

| | | | |
|---|---|---|---|
| 2007/0107021 A1* | 5/2007 | Angel et al. | 725/86 |
| 2007/0186252 A1* | 8/2007 | Maggio | 725/86 |
| 2008/0147505 A1 | 6/2008 | Davis | |
| 2008/0313664 A1 | 12/2008 | Benco et al. | |
| 2009/0083815 A1* | 3/2009 | McMaster et al. | 725/110 |
| 2009/0197523 A1* | 8/2009 | Seok et al. | 455/3.01 |
| 2009/0235312 A1* | 9/2009 | Morad et al. | 725/44 |
| 2010/0146542 A1* | 6/2010 | Weihs et al. | 725/34 |
| 2010/0269128 A1* | 10/2010 | Gordon | 725/25 |
| 2011/0145857 A1* | 6/2011 | Agarwal et al. | 725/32 |
| 2011/0247042 A1* | 10/2011 | Mallinson | 725/86 |
| 2012/0150903 A1 | 6/2012 | Davis et al. | |
| 2012/0192231 A1* | 7/2012 | Maa | 725/38 |
| 2012/0311623 A1 | 12/2012 | Davis et al. | |
| 2013/0019262 A1* | 1/2013 | Bhatia et al. | 725/34 |
| 2013/0144691 A1* | 6/2013 | Mehta et al. | 705/14.4 |
| 2013/0219424 A1* | 8/2013 | Lechner et al. | 725/32 |
| 2014/0013344 A1* | 1/2014 | Taxier | 725/10 |
| 2014/0059591 A1* | 2/2014 | Terpstra et al. | 725/32 |

\* cited by examiner

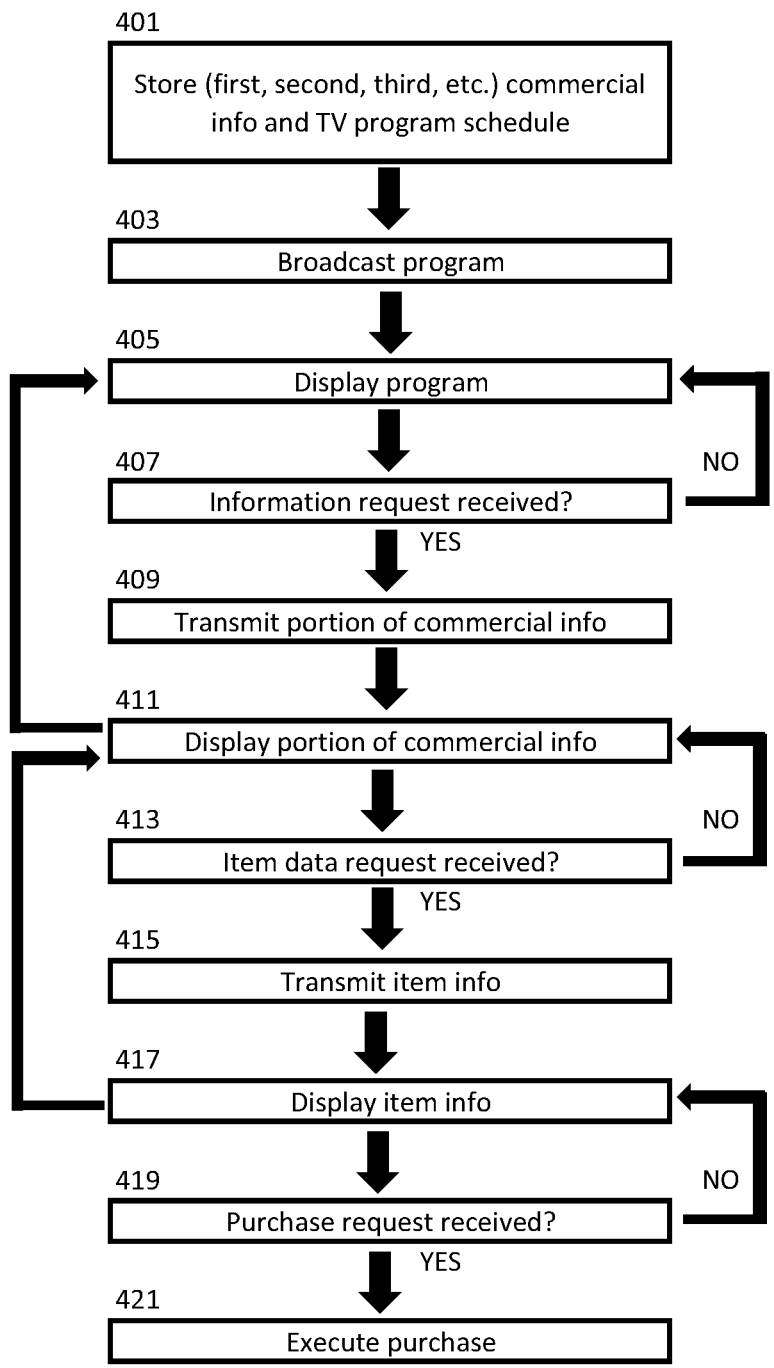

TELEVISION ADVERTISEMENT SYSTEM AND METHOD

BACKGROUND

No federally sponsored research or development, and no sequence listing, table, or computer program listing compact disc appendix is applicable to this application.

The present disclosure relates to the field of television advertising. More particularly, the present disclosure relates to a system and method of providing commercial information and purchase opportunities to a viewer of a television program, the commercial information and purchase opportunities relating to products and services displayed in the television program.

Traditional commercial advertising on television consists of a span of television programming produced and paid for by an organization, which conveys a message, typically to market a product or service. Modernly, commercial advertising may be embedded within the content of a television program, for example, through product placement. Successful product placement requires that the product be easily identified (e.g., by brand name) and remembered by the viewer.

However, viewers may be interested in purchasing products or services seen in a television program which are not easily identified from the context of the program. For example, viewers may be interested in purchasing articles of clothing worn by the actors in a television show. Viewers may also be interested in booking travel accommodations for locations seen in a television show.

Unfortunately, there does not exist a method by which television viewers may instantly access commercial information relating to products, services, and places seen in a television program. There also does not exist a method by which viewers can purchase the products or book travel accommodations to the places using the same conduit of instant access by which they have received the commercial information.

It is well known that a sales opportunity should be presented to a potential buyer at the moment that the buyer's interest is piqued. Otherwise, the sales opportunity may be lost forever. Presently, a television viewer interested in purchasing a product displayed during a television program must personally conduct a search for the product, for example, on the internet. Such a search is likely to be time-consuming and ultimately fruitless, since the viewer most likely does not have any information about the product other than general appearance. Furthermore, to conduct the search, the viewer must choose to either divert his attention away from the television program, or wait until after the program, at which point the viewer may have entirely forgotten about the desired purchase.

The method of this disclosure overcomes the above problems and has further advantages as described in the following detailed description and related drawing figures.

BRIEF SUMMARY AND OBJECTIVES

The present disclosure describes a system and method of television advertising which combines television viewing and shopping in a new and novel way. The system and method present instant commercial information and purchase opportunities to a viewer of a television program, wherein the commercial information and purchase opportunities relate to products and services displayed in the television program.

An advantage of the present method is to enable television viewers to instantly access commercial information relating to products, services, and locations displayed in a television program.

Another advantage is to enable viewers to purchase the products or services using the same conduit of instant access by which they have received the commercial information.

Another advantage is that, unlike product placement, the present method does not require that the displayed products be easily recognized and identified by the viewer.

Another advantage is that the viewer who wishes to make a purchase does not have to pause or interrupt the program to view the commercial information or to save the commercial information for later viewing.

Another advantage is that the viewer can access commercial information specific to the products, services, and/or locations at the particular time in the program at which the request for commercial information is made.

Another advantage of at least one embodiment is that access to the commercial information and purchase opportunities can be controlled by the same remote control device which controls the television.

The details of one or more embodiments of these concepts are set forth in the accompanying drawings and the description below. Other features, objects, and advantages of these concepts will be apparent from the description and drawings, and from the claims.

BRIEF DESCRIPTION OF THE SEVERAL VIEWS OF THE DRAWINGS

FIG. 4 is a flowchart showing an exemplary method of presenting commercial information and purchase opportunities to a viewer.

Like reference symbols in the various drawings indicate like elements.

DETAILED DESCRIPTION

Figure 1:
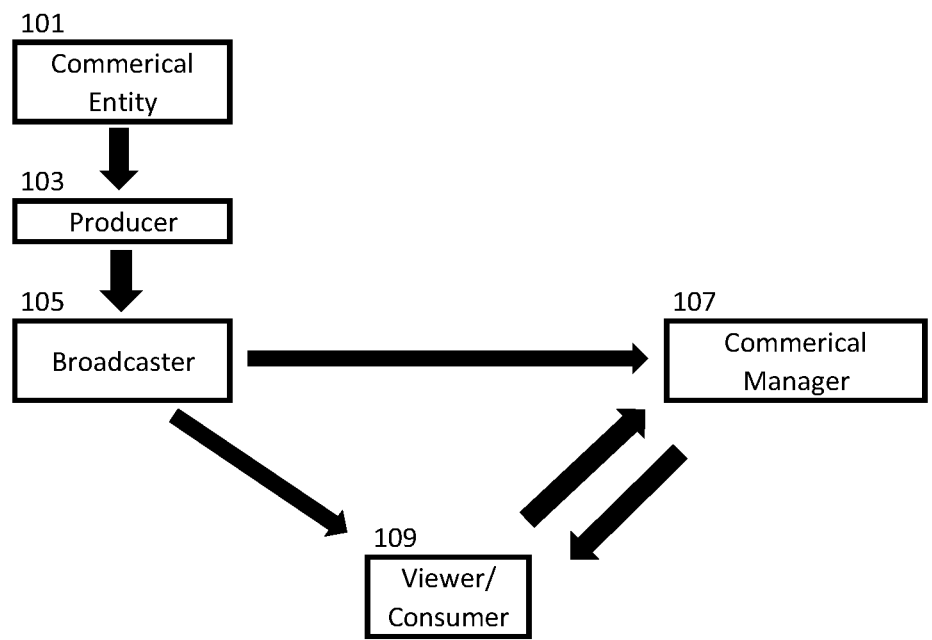
FIG. 1 is a diagram showing an exemplary organizational structure of human and organizational entities according to the present disclosure.

FIG. 1 is a diagram showing an exemplary organizational structure of human entities (people, companies, organizations) involved in presenting commercial information and purchase opportunities to a television viewer. As shown in FIG. 1, the various human entities may include a commercial entity 101. Commercial entity 101 is typically a person or business which sells a product or service that commercial entity 101 would like to feature in a television program. Commercial entity 101 may also be a person or business which sells travel accommodations to or for a location featured in the television program. For simplicity, the featured product, service or travel accommodations will be hereinafter referred to simply as "product" or "items."

Commercial entity 101 may negotiate with a producer 103 of the television program to have their product featured in the television program. Producer 103 submits the television program to a broadcaster 105 who broadcasts the television program to a viewer or consumer 109. In actuality, broadcaster 105 will broadcast to a large number, e.g., thousands or even millions, of viewers 109. However, in the present example, and throughout the present disclosure, recitation of a singular item or entity also encompasses disclosure of a plural number of such items or entities.

Alternatively, producer 103 or broadcaster 105 may initiate negotiations with commercial entity 101, if producer 103 or broadcaster 105 anticipate featuring a product, service, or location in an upcoming television program. The television program may also be a live television program, since it is generally known in advance which products, services, and locations will be featured in a live broadcast.

Producer 103 may supply the broadcaster 105 with commercial information relating to the commercial entity's 101 product featured in the television program. The commercial information may include a brand name of the product, available sizes and colors of the product, a price of the product, a date when the product will go on sale, an internet link (URL) where the product can be purchased, or any other information related to the product.

Broadcaster 105 may then supply the commercial information to a commercial manager 107. In alternative embodiments, producer 103 may directly supply commercial manager 107 with the commercial information.

Commercial manager 107 may be a part of the same organization as broadcaster 105 or may be organizationally separate from broadcaster 105. Commercial manager 107 generally organizes and stores the commercial information for the product, e.g., on a website or web server or business server. The commercial information may be stored using a cloud-based data storage service. Commercial manager 107 enables viewer 109 to view the stored commercial information and make a purchase of the product, e.g., through an internet link (URL).

Commercial manager 107 will generally store commercial information for multiple products corresponding to each of multiple television programs. For a given television program, the commercial information may be organized into multiple portions. Each portion of commercial information may correspond to a segment of time in the television program. For example, in a first minute of the television program, a first set of products may be displayed and a first portion of commercial information stored for the first set of products. In a second minute of the television program, a second set of products may be displayed and a second portion of commercial information stored for the second set of products. Whether the first portion or second portion of commercial information is displayed may depend on when viewer 109 requests the commercial information.

Viewer 109 requests the commercial information for displayed products through his or her remote control (television remote), cell phone, PDA, tablet computer, or other computer. Viewer 109 is generally presented with commercial information specific to the time in the television program at which viewer 109 makes the request. Viewer 109 may then browse commercial information relating to earlier (or later) times in the same television program, or relating to other television programs for which commercial information is available. Viewer 109 may then make a purchase of one or more of the products through commercial manager 107, or by following an internet link to the product manufacturer or retailer's website provided by commercial manager 107.

Figure 2:
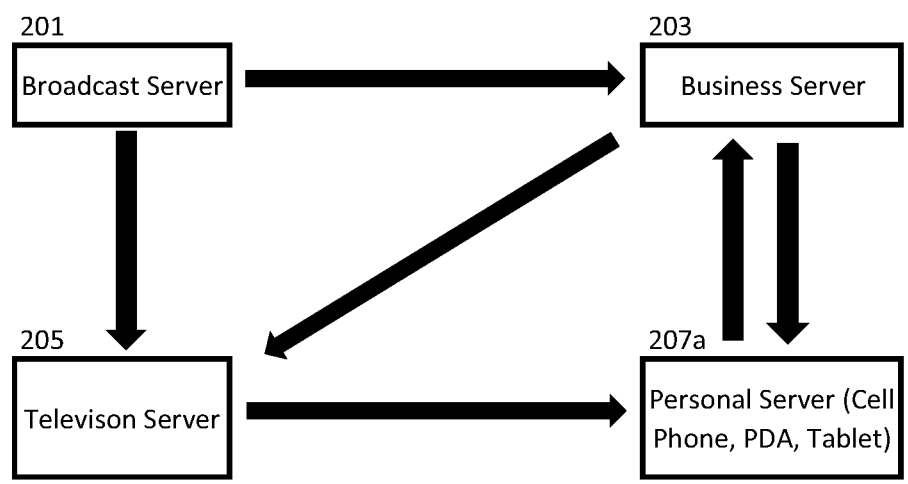
FIG. 2 is a diagram showing an exemplary organizational structure of computer devices according to the present disclosure.

FIG. 2 is an exemplary diagram showing the computer entities involved in the present system and method, including information and data transfer, according to a first embodiment. In the first embodiment, the commercial information is accessed through a viewer's 109 personal internet-capable device, such as a cell phone (mobile phone or smart phone), personal digital assistant (PDA), or tablet computer, denoted in FIG. 2 as personal server 207*a*.

A broadcaster server 201 corresponding to broadcaster 105 broadcasts the television program to a television server 205. Television server 205 may be a conventional television, or in fact, may be a computer capable of receiving and displaying television programming. Television server 205 may include a cable or satellite receiver. Prior to (or simultaneous with) broadcasting the television program, broadcast server 201 may transmit the commercial information to a business server 203 corresponding to commercial manager 107. The commercial information is then stored in business server 203. Alternatively, the receipt and/or storage of the commercial information may occur without any transmission from broadcast server 201.

In one embodiment, the television program may contain an icon or logo which appears on a screen of the television server during the television program. Personal server 207*a* may be enabled to scan this icon (e.g., using a QR reader or similar application) in order to access business server 203. Alternatively, personal server 207*a* need not be enabled to scan the icon, but rather viewer 109 sees the icon and is thus alerted that there is commercial information available. In another alternative, no icon is displayed, but viewer 109 is simply aware of the possibility of commercial information, e.g., through general advertising of a service which provides the commercial information.

Personal server 207*a* may then access business server 203 through an application of personal server 207*a* or through an internet browser of personal server 207*a*. An information request is sent from personal server 207*a* to business server 203 requesting commercial information. Personal server 207*a* accesses business server 203 to receive the commercial information and enable viewer 109 to make purchases of one or more products, if desired. Accessing the commercial information generally includes displaying the commercial information on a screen of personal server 207*a*.

Additionally, or alternatively, personal server 207*a* transmits an instruction to business server 203 to send an email or other message to television server 205 (or other computer) to store or "bookmark" the commercial information for later viewing. The bookmarking feature can enable viewer 109 to continue watching the television program uninterrupted. At a later time, the message will remind viewer 109 to explore the product(s) displayed at the time of bookmarking.

The information request transmitted to business server 203 may contain an identification of the television program, e.g., identifying the particular episode of the television program, and may also contain a timestamp. The timestamp may indicate a particular point in time during the television program at which the information request was transmitted. The timestamp enables business server 203 to determine what portion of commercial information corresponds to products, services, and/or locations which were displayed at that point in time in the television program. Consequently, the most relevant information is thereby provided to viewer 109.

Figure 3:
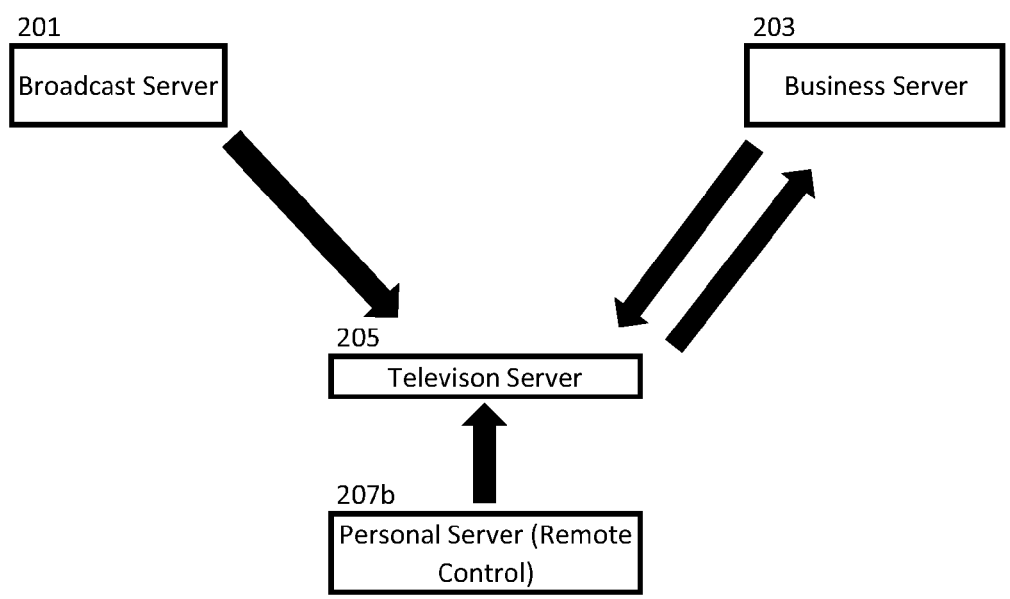
FIG. 3 is a diagram showing an exemplary organizational structure of computer devices according to an additional embodiment of the present disclosure.

FIG. 3 is an exemplary diagram showing the computer entities involved in the present system and method, including information and data transfer, according to a second embodiment. In the second embodiment, the commercial information is accessed through a viewer's 109 remote control, denoted in FIG. 3 as personal server 207*b*. In the second embodiment, television server 205 is capable of receiving and displaying both the television program from broadcast server 201, and the commercial information from business server 203.

Personal server 207b generally permits viewer 109 to have ordinary or conventional access to channel selection, volume adjustment, etc., for television server 205, but also allows viewer 109 to control the display of the commercial information. For example, a button or combination of buttons on personal server 207b will transmit the request for commercial information to television server 205. Television server 205 in turn, transmits the information request to business server 203. Business server 203 then transmits the commercial information, or a portion thereof, to television server 205. Thus, in the second embodiment, personal server 207b does not need to be a device having an internet connection, or even be an internet-capable device. In the second embodiment, personal server 207b may be a one-way (e.g., transmit-only) device, which simply transmits a signal or signals to television server 205.

The commercial information received by television server 205 from business server 203 is generally displayed on a screen which is part of, or connected to, television server 205. The commercial information may be displayed at the same time as the television program, e.g., in a split-screen view on the television server 205 screen. Personal server 207b permits viewer 109 to browse (e.g., scroll through) the commercial information on the screen of television server 205, display information specific to an individual product, and execute a purchase of the product.

FIG. 4 is a flowchart showing an exemplary method of presenting commercial information and purchase opportunities to a viewer to thereby combine television viewing and shopping in a new and novel way. As shown in FIG. 4, the method may begin at 401 with storing commercial information relating to one or more television programs in a business server. The method may also include storing a television program schedule in either a television server or a personal server (or both). At 403, a television program is broadcast according to the television program schedule from a broadcast server to the television server, thereby enabling viewing of the television program by a consumer.

At 405, the television program is displayed to the consumer, e.g., on a screen of the television server. At some point in time during the television program, an information request may be transmitted by the personal server and received by the business server. The information request may include an identification of the television program and a timestamp, containing, for example, an identification of the particular episode of the television program and an identification of a particular time at which the information request is submitted. At 407, if an information request is received, then at 409, the business server will transmit a portion of the commercial information to the television server or the personal server. However, if no information request is received, the method returns to 405 at which the television program continues to be displayed as it would during ordinary television viewing.

The commercial information portion may be selected based upon the identification of the television and the timestamp. At 411, the commercial information portion is displayed on a screen of the personal server or the television server. If the consumer finishes browsing the commercial information or otherwise wishes to hide the commercial information, then the consumer may transmit an instruction through the personal server to hide (or un-display) the commercial information, and the method may return to 405 for ordinary display of the television program.

Optionally, at 413, a consumer may transmit a request for more detailed data or information relating to a particular item displayed in the commercial information. At 413, if the item data request is received, then the method proceeds to 415 where commercial information for the selected item is transmitted from the business server to the personal server or television server (or both). However, if the item data request is not received, then the method returns to 411 at which the commercial information portion continues to be displayed.

At 417, the commercial data for the selected item is displayed on a screen of the personal server or television server. If the consumer finishes browsing the selected item information, then the consumer may transmit an instruction through the personal server to return to the initial commercial information, and the method may return to 411 for display of the initial commercial information. If the consumer wishes to make a purchase of an item displayed in the commercial information, then a purchase request is transmitted from the personal server to the business server. At 419, if the purchase request is received by the business server, then at 421 a purchase of the item is executed. The purchase may be executed similar to conventional methods of purchasing goods or services through an internet browser.

It should be noted that additional or alternative steps, or ordering of the steps, are encompassed within the scope of the present disclosure. For example, the method may proceed directly from 411 to 419 whereby a consumer wishes to engage in a purchase of an item displayed in the commercial information portion.

In some embodiments, the personal server or television server is connected to a social media account of the consumer (e.g., Facebook, Twitter, etc.). Upon executing a purchase, the personal server or television server will post a message (via the social media account) on the consumer's behalf, for example, indicating to other social media users that the consumer has made a purchase of an item and identifying the particular television show in which the item was displayed.

Embodiments of the subject apparatus and method have been described herein. Nevertheless, it will be understood that various modifications may be made without departing from the spirit and understanding of this disclosure. Accordingly, other embodiments and approaches are within the scope of the following claims.

What is claimed is:

1. An information processing method combining television program viewing and shopping, said information processing method using a television program broadcast server device, a business server device and a consumer server device, said method comprising:

accessing a commercial information data store comprising product names and segments of time when sets of products appear in an episode of a television program, wherein said commercial information data store comprises:

one or more first product names associated with a first segment of time for at least a first set of products appearing in said episode of said television program during said first segment of time; and one or more second product names associated with a second segment of time, different from said first segment of time, for at least a second set of products, different from said first set of products, appearing in said episode of said television program during said second segment of time;

broadcasting, from said broadcast server device, said episode of said television program to said consumer server device;

receiving, from said consumer server device, an information request at a time selected by a viewer during a broadcast of said episode of said television program;

identifying a set of products and a segment of time from said commercial information data store associated with said time of said information request;

transmitting, from said business server device, product names of said set of products identified from said commercial information data store to said consumer server device during said broadcast of said episode of said television program;

receiving, from said consumer server device, a commercial data request for price and availability of one or more particular products from said set of products selected by said viewer;

transmitting, from said business server device, a price and availability of each of said one or more particular products to said consumer server device;

receiving, from said consumer server device, a purchase request identifying at least a name and a quantity for at least one of said one or more particular products; and executing said purchase request.

2. The information processing method of claim 1, wherein transmissions between the consumer server device and the business server device are made over the Internet.

3. The information processing method of claim 1, wherein transmissions of the television program between the television program broadcasting device and the consumer server device are made via public television transmission and reception channels.

4. The information processing method of claim 1, wherein transmissions between said broadcast server device and said consumer server device are made through a television server device.

5. The information processing method of claim 1, wherein transmissions between said consumer server device and said business server device are made through a television server device.

6. The information processing method of claim 1, further comprising receiving an instruction to hide commercial information from said consumer server device.

7. The information processing method of claim 1, further comprising:

receiving from said consumer server device a bookmark instruction to store commercial information for a later viewing at a time and date of said episode of said television program selected by said viewer during a broadcast of said episode of said television program;

storing names of products that correspond to said selected time and date; transmitting a message reminding said viewer to view said products that correspond to said selected time and date of said bookmark instruction to said consumer server device;

receiving from said consumer server device an information request by said viewer; and transmitting from said business server to said consumer server said commercial information of said products.

8. The information processing method of claim 1, wherein said commercial information data store comprises descriptions of brand names, available sizes, and colors of said products.

9. The information processing method of claim 1, wherein said commercial information data store comprises prices of said products.

10. The information processing method of claim 1, wherein said commercial information data store comprises dates when said products go on sale.

11. The information processing method of claim 1, wherein said commercial information data store comprises payment information and delivery information associated with said purchase request.

12. The information processing method of claim 1, wherein said commercial information data store is stored using a cloud-based data storage service.

13. The information processing method of claim 1, wherein said information request identifies said episode of said television program.

14. The information processing method of claim 13, wherein said information request comprises a timestamp, wherein said timestamp indicates a particular point in time during said episode of said television program at which said information request is transmitted by said viewer.

15. The information processing method of claim 1, further comprising:

connecting said television server device to a social media account of said viewer;

after executing said purchase request, posting a social media message to said social media account on behalf of said viewer identifying said episode of said television program in which said one or more products are displayed.

* * * * *